United States Patent [19]
Fuller et al.

[11] 3,838,958
[45] Oct. 1, 1974

[54] MULTI LAYER CAPACITOR AND APPARATUS FOR MAKING SAME WITH SCREEN VIBRATING MEANS

[75] Inventors: Fred J. Fuller, Chicago; John G. Kirschner, Northbrook; Richard A. Stark, Des Plaines, all of Ill.

[73] Assignee: P. R. Mallory & Co., Inc., Indianapolis, Ind.

[22] Filed: Dec. 10, 1973

[21] Appl. No.: 423,184

Related U.S. Application Data
[62] Division of Ser. No. 302,029, Oct. 30, 1972.

[52] U.S. Cl. ............... 425/197, 425/79, 425/363, 425/367, 425/230
[51] Int. Cl. ............................................. B29c 15/00
[58] Field of Search ........... 425/197, 335, 367, 363, 425/115, 79, 223, 224, 230

[56] References Cited
UNITED STATES PATENTS

| | | |
|---|---|---|
| 1,277,729 | 9/1918 | Kearns ............................ 425/335 |
| 1,990,634 | 2/1935 | Brown et al. .................... 425/197 X |
| 2,615,404 | 10/1952 | Crasland et al. ................. 425/363 X |
| 2,814,260 | 11/1957 | Morgan ........................... 425/363 X |
| 2,941,239 | 6/1960 | Theysohn ........................ 425/335 X |
| 2,960,044 | 11/1960 | Anetsberger .................... 425/363 X |
| 3,060,502 | 10/1962 | Snyder ............................ 425/363 |
| 3,276,074 | 10/1966 | Yamaguchi ...................... 425/363 X |
| 3,339,233 | 9/1967 | Woitzel et al. ................... 425/363 X |
| 3,497,321 | 2/1970 | Decker et al. ................... 425/363 X |
| R26,665 | 9/1969 | Powell ............................. 425/79 |

*Primary Examiner*—Robert L. Spicer, Jr.
*Attorney, Agent, or Firm*—Charles W. Hoffman; Robert F. Meyer

[57] ABSTRACT

The ceramic layer of multi-layered ceramic capacitors is provided by pressure rolling powders into sheets or films.

A machine used to roll the powder utilizes a feed control roll disposed between and in working relationship between a stationary back-up roll and an adjustable compression roll.

5 Claims, 8 Drawing Figures

PATENTED OCT 1 1974  3,838,958
SHEET 1 OF 4
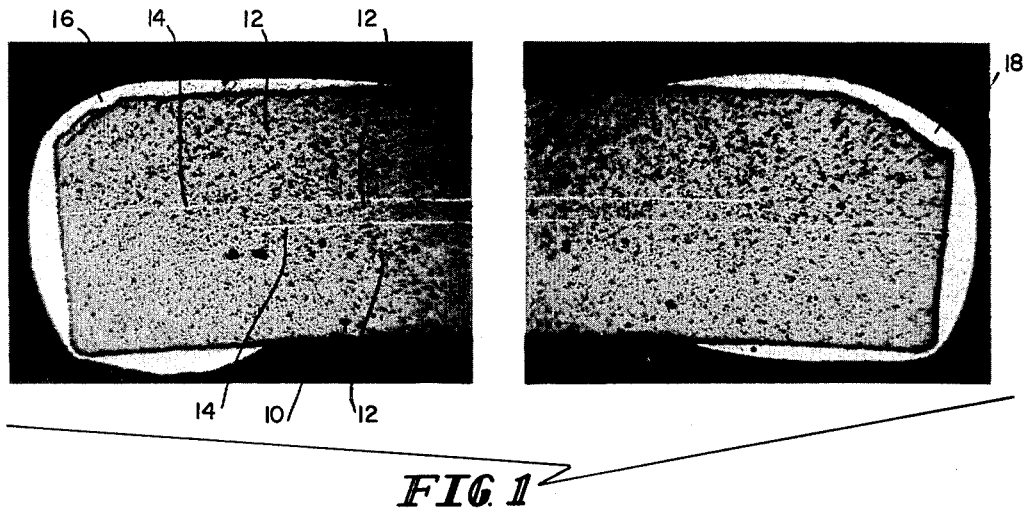
FIG. 1
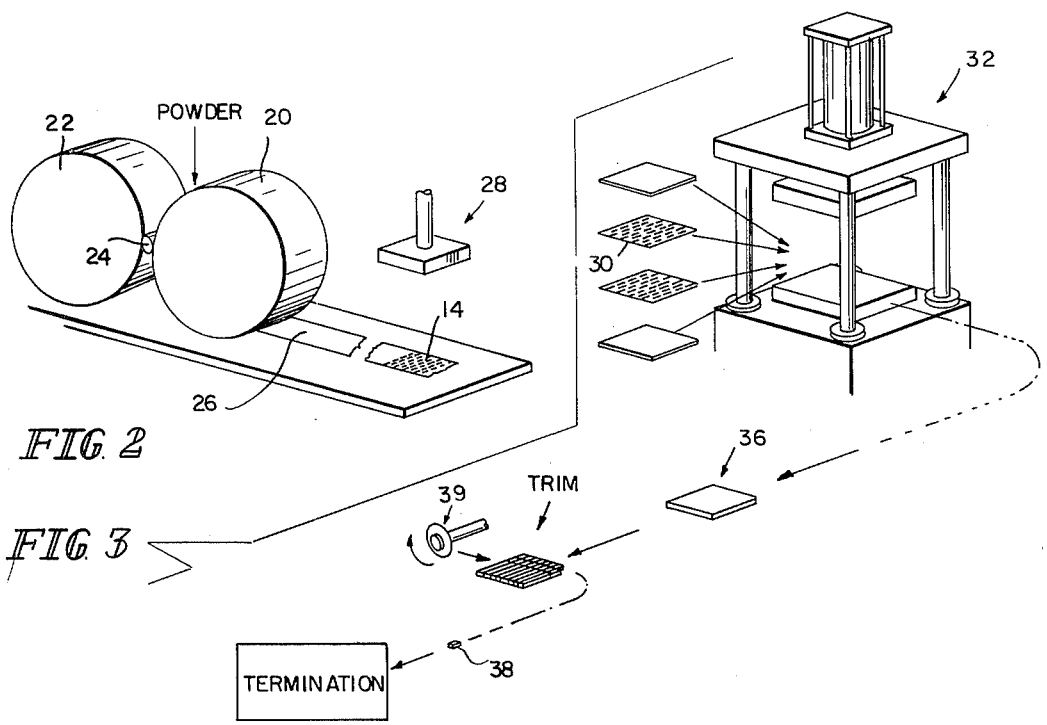
FIG. 2
FIG. 3

MULTI LAYER CAPACITOR AND APPARATUS FOR MAKING SAME WITH SCREEN VIBRATING MEANS

RELATED U.S. APPLICATION

Ser. No. 302,029, filed Oct. 30, 1972

This invention relates to multi-layered ceramic capacitors; and more particularly it relates to such a capacitor having powder rolled ceramic layers and to a means and method of providing such layers.

Multi-layered miniature capacitors are used extensively in hybrid integrated circuits and microminaturized printed circuits. Such capacitors provide higher capacitor values than those attained in monolithic integrated circuits. In order to meet its intended uses, such capacitors should enclose a high electrical capacitance within a small volume and it should also be capable of simple and inexpensive manufacture.

For the most part such capacitors have been made by a slip casting technique. While for the most part satisfactory, this technique is somewhat time consuming and expensive. In addition, capacitors made by the slip casting process sometimes had "pinholes" such that there was short circuiting and dielectric failure.

The present invention is concerned with the making of multi-layered ceramic capacitors and has as one of its objects the provision of a multi-layered ceramic capacitor having substantially no pinholes or voids in its structure.

Another object of the invention is the provision of a multi-layered ceramic capacitor wherein the ceramic layers are formed by powder rolling techniques.

Still another object of the invention is the provision of a powder rolling machine.

Yet another object of the invention is the provision of a powder rolling machine capable of rolling ceramic powders into a very fine film.

Another object of the invention is the provision of a powder rolling machine having a stationary back up roll and an adjustable compression roll with a drive and feed control roll disposed between the stationary and compression roll and in working relationship therewith.

These and other objects of the invention will become apparent from the following description taken in conjunction with the accompanying drawings wherein:

FIG. 1 is an enlarged photograph of a partial section of a multi-layered ceramic capacitor;

FIG. 2 is a schematic showing a process step in forming multi-layered ceramic capacitors according to the invention;

FIG. 3 is a schematic showing another process step in forming the capacitors;

Figure 4:
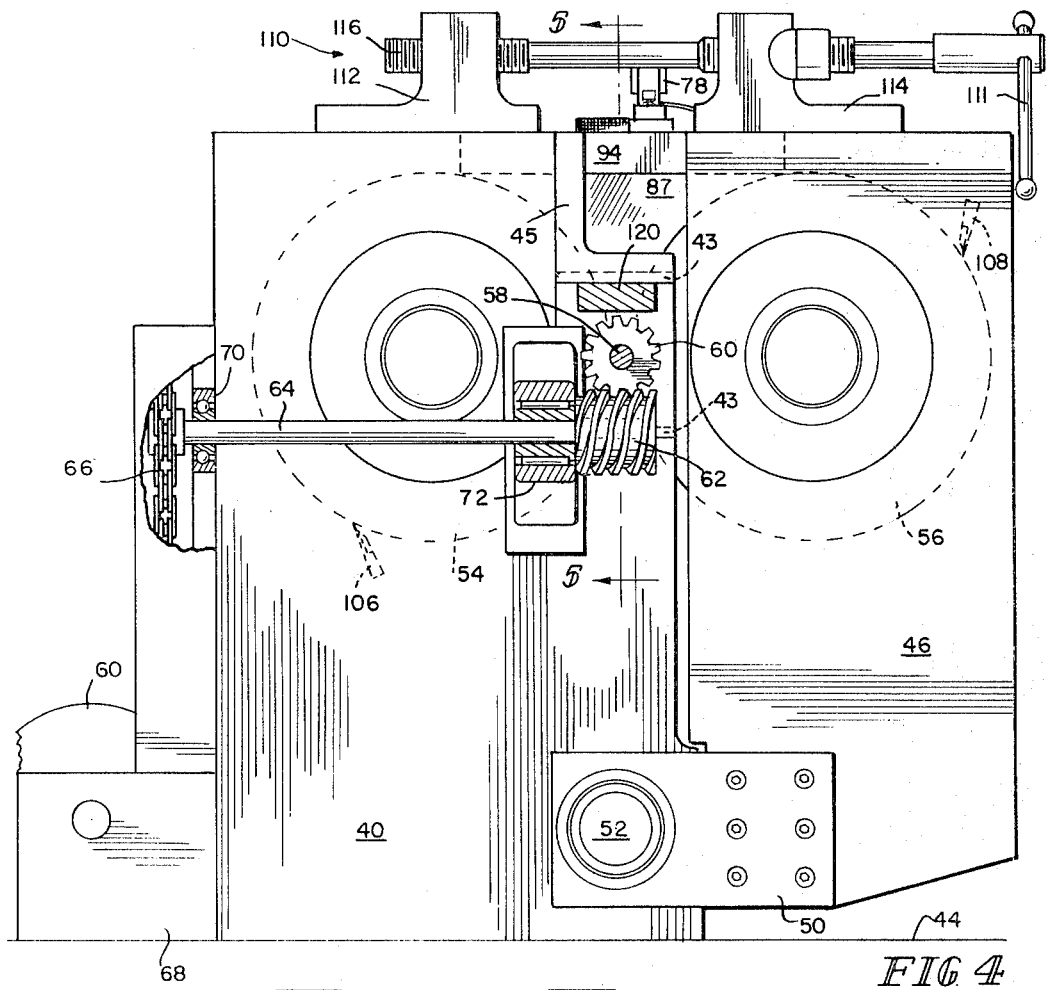
FIG. 4 is a front elevation of a powder rolling machine.
Figure 5:
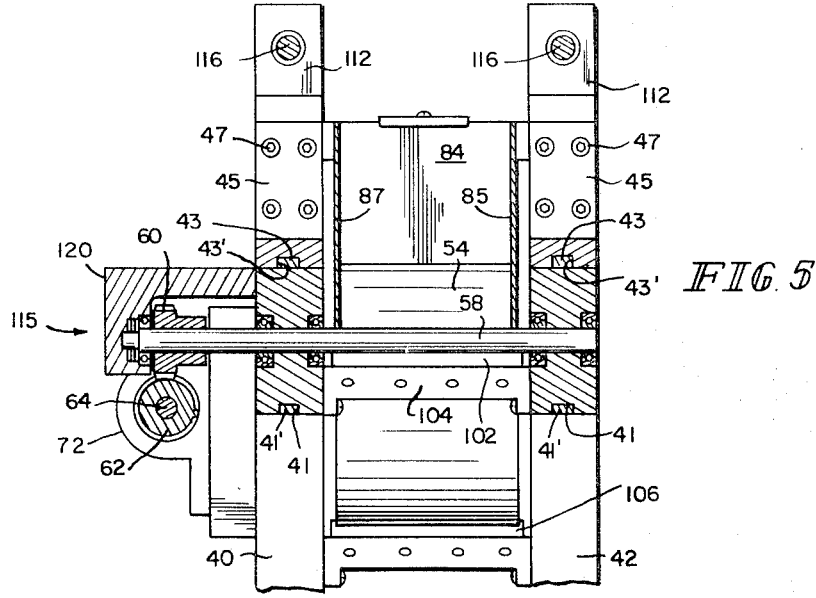
FIG. 5 is a section taken along the line 5—5 FIG. 4.

Generally speaking, the present invention is directed to a multi-layered ceramic capacitor comprising a body containing a plurality of alternate layers of pressure rolled ceramic and metallic electrodes and outer termination layer portions electrically connecting alternate electrode layers.

The multi-layered ceramic capacitor is fabricated by passing powders of the ceramic through a rolling machine to compact the powder into a very thin sheet or film, printing metallic electrodes on the sheet in a predetermined pattern, pressure bonding a predetermined number of the sheets together, trimming, if necessary, the sheets to a predetermined size, and then applying termination layers portions to ends of the sheets to electrically connect alternate electrode layers.

A powder rolling machine particularly adaptable to rolling the ceramic powder into the required film, in general includes a stationary back up roll, an adjustable compression roll, a drive and feed control roll disposed between the back-up and compression rolls and in working relationship therewith, and means supplying powder to a compacting area defined by the compression roll and the drive and feed control roll.

Referring now to the drawings, and in particular FIG. 1, there is shown a multi-layered ceramic capacitor, which in general comprises a body 10 which is composed of ceramic layers 12 each separated by an inner electrode layer 14. The electrodes 14 extend substantially over the interface between adjacent ceramic layers. The inner electrode layers alternate in their extension to the oppositely opposed ends of the ceramic layers and the alternate inner electrode layers are electrically connected by outer termination or electrode layer portions 16 and 18 thus providing alternate polarity electrodes over substantially all of the ceramic layers therebetween. The outer termination layer portions ususlly encase each end of the body as well as provide an electrode portion for attachment into electrical circuitry. It should be understood that although three layers of ceramic and two layers of electrodes are shown, the invention need not be so limited and that any number of desired layers may be used.

The ceramic materials which can be employed include one or more ceramic constituents, such as barium, calcium, lead and/or strontium titanate with or without the addition of zirconates of the above mentioned and other metals and metallic oxides. These usually produce ceramics of relatively high dielectric constant generally desirable for relatively high capacitance capacitors.

Metals which can be employed as electrodes and termination portions include metallic conductors and their alloys. Preferably such metals should not deleteriously react or alloy with the constituents, such as the metallic constituents, of the ceramic material. Typical metals include high temperature metals and alloys which have melting points at or above the sintering temperature of the ceramic material such as refractory metals i.e., tungsten, molybdenum and the like, and alloys containing such, and the noble metals such as palladium, platinum, gold and silver and alloys containing such.

According to a feature of the present invention, the ceramic layers 12 are provided by pressure rolling ceramic powders into a thin sheet or film. It has been found that when the ceramic layers are so formed that there is substantially no failure of the dielectric or short circuiting. It is believed that such improved properties of the capacitor are achieved by virtue of the powder rolled material being relatively dense with substantially no pinholes with a more uniform ceramic film.

Referring to FIGS. 2 and 3 there is shown schematically the process steps for forming the multi-layered capacitor of FIG. 1 using powder rolled ceramic for layers 12. Powders of a suitable ceramic are fed to pressure rolls 20, 22 and 24 with the powder being rolled primarily between rolls 20 and 24, roll 22 being a back-up roll. The rolled powder emanates from the rolls as a very thin sheet or film 26. The inner electrodes 14 are then printed on the film in a predetermined pattern through a suitable printing applicator means 28. The electrodes may be applied as a metallic paste or paint, for example. The sheets are then cut to a predetermined size and then, as shown in FIG. 3 are fed to a press means 32 to be bonded together to form a body 36 which is then trimmed to a predetermined size 38 through cutting means 39. As indicated, outer termination layer 16 and 18 (FIG. 1) are then applied to complete the body 10 of FIG. 1. The application of the termination layers and electrical terminals for attachment into electrical circuits may be accomplished in a manner well known in the capacitor art and form no part of the present invention. For example, well known dipping techniques may be used.

Referring now to FIGS. 4-8, there is shown a machine particularly adaptable to rolling powders of ceramics, such as previously noted, into very fine sheets or films. In general, the fine film is achieved through a three roll machine wherein a small center roll is used as the drive and feed roll with the powders being rolled between it and another larger roll. A third larger roll serves as a backup roll and operates against a side of the center roll opposite the other larger roll.

Figure 6:
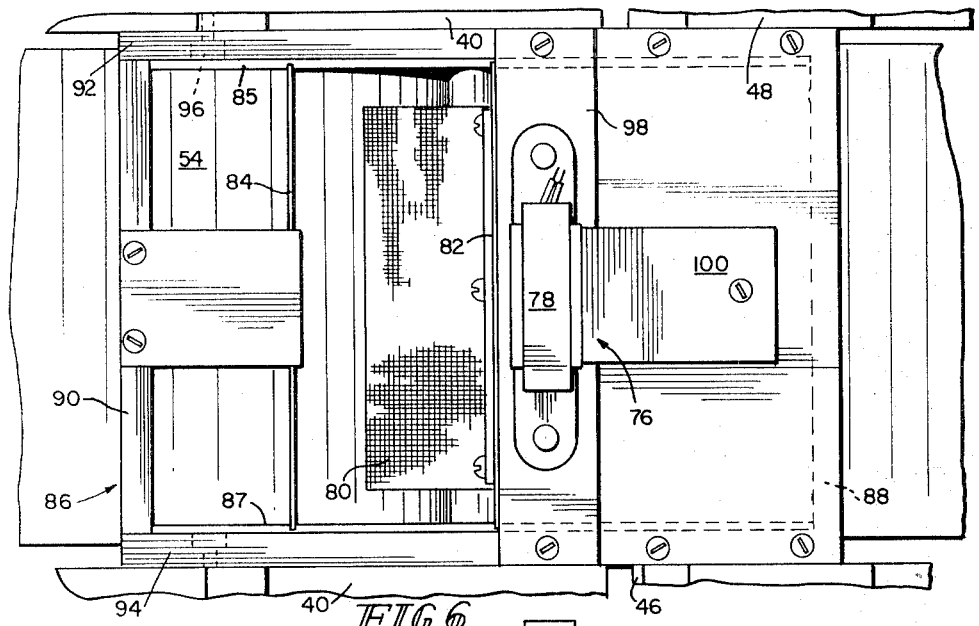
FIG. 6 is a top view of a portion of the machine.

In FIGS. 4 and 6 there is shown a first pair of plates 40 and 42 carried on a suitable base 44. A second pair of plates 46 and 48 are pivotally mounted on plates 40 and 42 through a pair of plates 50 coupled to a shaft 52, the shaft being rotatably mounted in plates 40 and 42. Rotatably journalled in plates 40 and 42 is a relatively large roll 54. A second large roll 56 is rotatably journalled in plates 46 and 48. Since roll 54 is carried by fixed plates 40 and 42 it is stationary as opposed to roll 56 which is movable, being carried by pivotally mounted plates 46 and 48.

A third center roll 58 of relatively smaller diameter is rotatably journalled in plates 40 and 42 and disposed in working relation between rolls 54 and 56. As shown in the illustrative embodiment, roll 58 serves as a drive and feed control roll. However, it should be understood that the invention need not be so limited and that either of the other rolls may serve as the drive roll. Roll 58 is power driven through a suitable motor, the roll being coupled to the motor through pinion 60 which is fixedly carried by the roll, worm gear 62 which is fixedly carried on shaft 64, shaft 64 being rotated by the motor through chain drive 66 and suitable gear means disposed in housing 68. As shown, shaft 64 rotates in bearings 70 and 72. Rotation of roll 58 causes rotation of rolls 54 and 56; thus rolls 54 and 52 are driven by the center roll. As viewed in FIG. 7, center roll 58 is driven clockwise to drive rolls 54 and 56 counter-clockwise and clockwise respectively.

Figure 7:
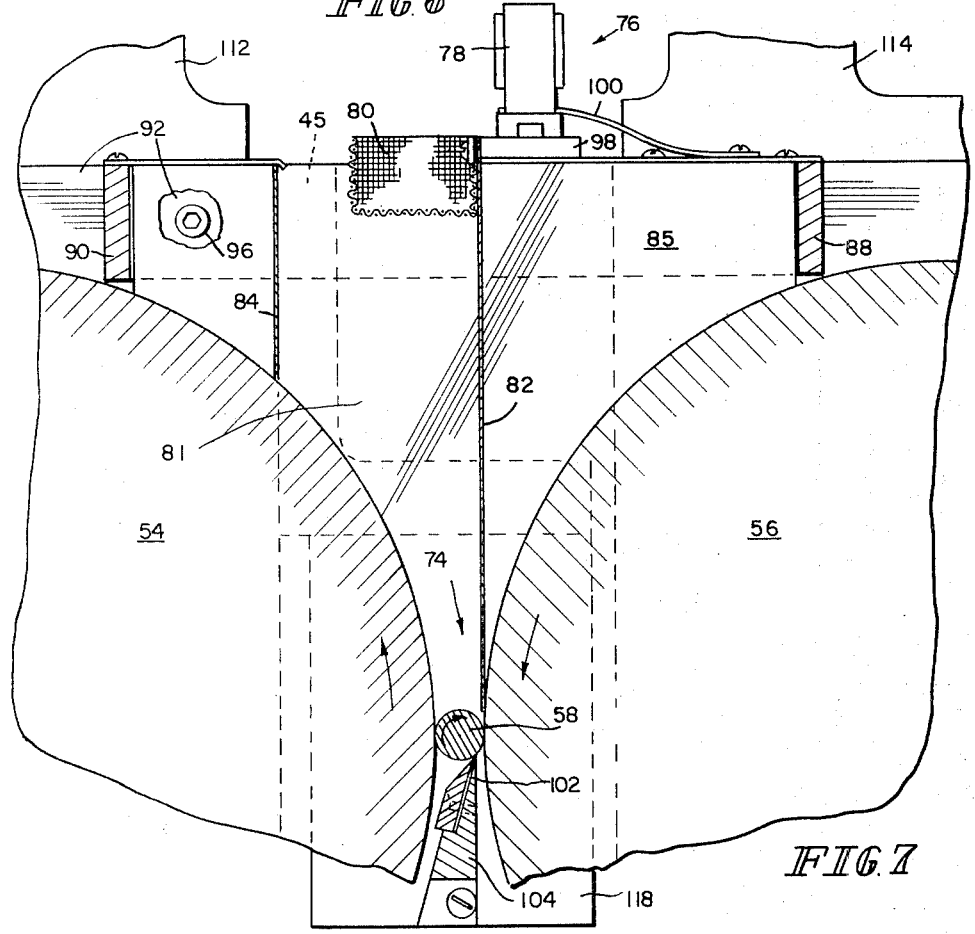
FIG. 7 is a transfer of FIG. 6.

Powder to be rolled is fed to a compacting area 74 (FIG. 7). The powder is fed to a box-like screen 80 which is vibrated by vibrator 78. Vibrator 78 is carried on a frame 86 which includes sidewalls 88, 90, and 94, the frame being fixedly held at one end to plates 40 and 42 through a plurality of bolts 96. The vibrator 78 is carried on the frame 86 through plate 98, the vibrator being held on the plate through spring 100. Screen 80 is vibrated by virtue of being attached to plate 98.

From the screen 80, the powder is fed through a compartment 81 formed by side walls 82, 84, 85, and 87. As shown in FIG. 7, wall 82 limits the powder compartment area so as to direct the powder away from the face of roller 56 until the powder reaches an area between roller 58 and the roll 56. Or, more precisely, the powder is directed away from roll 56 until it reaches the bite between rolls 56 and 58. Thus, the center roll 58 is the feed roll. This aids in maintaining a fine feed control of the powder so that close tolerances can be achieved in rolling the powder to a very fine sheet or film, for example .001 to .004 inches.

There is a blade 102 engaging roll 58 to maintain the roll free of powder. The blade is carried on a support 104 which is carried by plates 40 and 42. Similarly, as indicated in FIG. 4, there are blades 106 and 108 carried by plates 40, 42 and 46, 48 respectively to clean rolls 54 and 56 respectively.

A pair of micrometer adjusting means 110 provides for pivoting of the plates 46 and 48, thus permitting roll 56 to be adjusted. Each micrometer adjusting means 110 includes a pair of nuts 112 and 114, one each carried by the plates 40, 42 and 46, 48, and bolt 116 engaging the nuts. There is a thread differential between the two nuts so that a mechanical advantage is achieved when plates 46, 48 are pivoted by turning handle 111.

Figure 8:
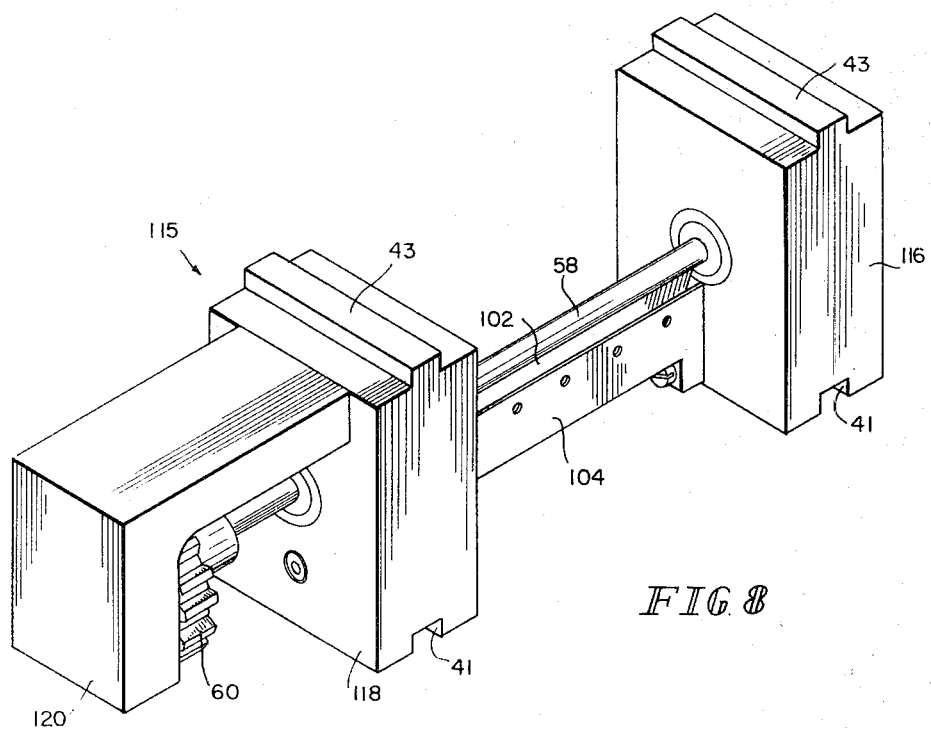
FIG. 8 is a perspective view of an element of the powder rolling machine.

Referring to FIG. 8, another feature of the machine is shown. As shown roll 58, blade 102 and its support frame 104, pinion 60, and support blocks 116, 118, and 120 are fabricated as a single unit to provide a cartridge 115. Blocks 116 and 118 are adapted to be received by plates 40 and 42. Notches 41 of the blocks receive projections 41' of the plates 40 and 42; while projections 43 engage notches 43' of an L-shaped frame 45. L-shaped frames 45 are secured to plates 40-42 through bolts 47. The roll 58 can be easily replaced with a different size roll. When such replacement is made the positioning of roll 56 needs to be adjusted to properly cooperate with the new roll. This can be easily accomplished through the micrometer adjusting means 110.

In operation, powder is fed through screen 80 through compartment 81 to the compacting area 74. The powder will be rolled between rolls 56 and 58, roll 54 serving as a back up roll. Rolls 58 will serve as the drive roll driving rolls 56 and 58 through friction. Since there is substantially no powder reaching roll 56 until an area at the bite between rolls 54 and 56, roll 58 will determine the rate of feed for better and close tolerances. The powder passing between the rolls will be rolled into a thin sheet or film.

What is claimed is:

1. A powder rolling machine comprising:
    a. a base,
    b. a first pair of spaced upstanding plates carried by said base,
    c. a first roll rotatably carried by said first pair of plates.
    d. a second pair of spaced upstanding plates pivotally carried by said first pair of plates,
    e. coupling means connecting said first and second pair of plates in a spaced predetermined position, f. a second roll rotatably carried by said second pair of plates in spaced relation to said first roll,
g. a cartridge carried by said first pair of plates, said cartridge including a rotatably mounted feed control roll disposed between and in working relation to said first and second rolls,
h. means supplying powder to a compacting area defined by said second roll and said feed control roll,
i. means applying power driven rotation to said feed control roll, and
j. said means supplying powder to a compacting area includes a screen for receiving powder carried by said second pair of movable plates and aligned with said compacting area, and vibrating means carried by said second pair of plates and connected to said screen.

2. A powder rolling machine according to claim 1 wherein said means supplying powder to a compacting area further comprises:
a. a chamber receiving powder from at least said screen, said chamber being defined by a pair of end walls at opposed ends of said rolls, a side wall terminating at a face of said first roll, and a side wall terminating at the bite of said second roll and said feed control roll.

3. A powder rolling machine according to claim 1 wherein said means supplying powder includes a screen disposed above and in line with said compacting area receiving said powder and means vibrating said screen.

4. A powder rolling machine according to claim 3 wherein said means supplying powder further includes spaced walls providing a chamber for said powder in line with said screen.

5. A powder rolling machine according to claim 4 wherein one of said walls extends from said screen to an area adjacent said compression roll and in close proximity to said drive and feed control roll so as to substantially limit the compacting area of said powder to the bite between said compression roll and said feed control roll.

* * * * *

UNITED STATES PATENT OFFICE
CERTIFICATE OF CORRECTION

Patent No. 3,838,958          Dated 10/01/74

Inventor(s) John G. Kirschner & Richard A. Stark

It is certified that error appears in the above-identified patent and that said Letters Patent are hereby corrected as shown below:

Col. 1, line 29 Insert---"    "---around pinholes

Col. 2, line 70 Insert---"    "---around pinholes

Col. 4, line 11-Insert---"    "---around bite

Col. 4, line 12, Insert---"   "---around fine

Col. 4, line 20 Insert---"    "---around clean

Col. 4, line 52, Insert---"   "---around bite

Signed and sealed this 24th day of June 1975.

(SEAL)
Attest:

RUTH C. MASON
Attesting Officer

C. MARSHALL DANN
Commissioner of Patents
and Trademarks